(12) United States Patent
Cherubini et al.

(10) Patent No.: US 7,843,795 B2
(45) Date of Patent: *Nov. 30, 2010

(54) STORAGE DEVICE AND METHOD FOR OPERATING A STORAGE DEVICE

(75) Inventors: Giovanni Cherubini, Rueschlikon (CH); Evangelos S. Eleftheriou, Zurich (CH); Haris Pozidis, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 312 days.

This patent is subject to a terminal disclaimer.

(21) Appl. No.: 12/170,515

(22) Filed: Jul. 10, 2008

(65) Prior Publication Data
US 2009/0003187 A1    Jan. 1, 2009

Related U.S. Application Data

(63) Continuation of application No. 10/441,344, filed on May 20, 2003, now Pat. No. 7,436,748.

(30) Foreign Application Priority Data
May 23, 2002    (EP) .................................. 02405415

(51) Int. Cl.
*G11B 7/00* (2006.01)
(52) U.S. Cl. ........................... 369/126; 369/101
(58) Field of Classification Search ................... 369/126
See application file for complete search history.

(56) References Cited

U.S. PATENT DOCUMENTS

| 3,537,075 | A | 10/1970 | Anderson et al. |
| 5,053,995 | A | 10/1991 | Kajimura et al. |
| 5,144,581 | A | 9/1992 | Toda et al. |
| 5,202,879 | A | 4/1993 | Oguchi et al. |
| 5,375,114 | A | 12/1994 | Hatanaka et al. |
| 5,481,522 | A | 1/1996 | Oguchi et al. |
| 5,801,779 | A | * | 9/1998 | Uz et al. ................. 375/240.24 |
| 5,835,477 | A | 11/1998 | Binnig et al. |
| 5,878,166 | A | * | 3/1999 | Legall .......................... 382/232 |
| 6,181,505 | B1 | 1/2001 | Sacks et al. |
| 6,226,139 | B1 | 5/2001 | Yada |
| 6,603,622 | B1 | 8/2003 | Christiansen et al. |

FOREIGN PATENT DOCUMENTS

| EP | 0445825 B1 | 4/1997 |
| EP | 0510579 B1 | 5/2000 |
| JP | 63-000828 | 1/1988 |
| JP | 11-296897 | 10/1999 |

* cited by examiner

OTHER PUBLICATIONS

EP Office Communication 03010257.8-1232 Dated Apr. 6, 2008.

*Primary Examiner*—Van N Chow
(74) *Attorney, Agent, or Firm*—Cantor Colburn LLP (57) ABSTRACT

A method of operating a storage device includes storing data in the form of marks in a storage medium; scanning the storage medium with at least one probe operating in a scanning mode; and utilizing a control unit to provide a pulsed reading signal for data detecting in the scanning mode, and providing the probe with oversampling reading pulses in a clock mark scanning mode, wherein the control unit further comprises an input for a response signal to the oversampling reading pulses, and a determination unit for determining the clock dependent on the response signal; wherein the storage medium comprises marks for determining a clock of the pulsed reading signal.

12 Claims, 7 Drawing Sheets

STORAGE DEVICE AND METHOD FOR OPERATING A STORAGE DEVICE

CROSS-REFERENCE TO RELATED APPLICATION

This application is a continuation of U.S. patent application Ser. No. 10/441,344, filed May 20, 2003, the disclosure of which is incorporated by reference herein in its entirety.

TECHNICAL FIELD

The present invention relates to a storage device and to a method for operating a storage device.

BACKGROUND OF THE INVENTION

New storage concepts have been introduced over the past few years. Exploiting the capability of imaging and investigating the structure of materials down to the atomic scale achieved by scanning tunneling microscopy (STM) and atomic force microscopy (AFM), probes having a tip are being introduced for scanning appropriate storage media, where data are written as sequences of bits represented by indentations and non-indentations. According to latest demonstrations, indentations with a diameter of the range of 30-40 nm have been written on appropriate storage media. These data storage concepts promise ultra-high storage areal densities.

First approaches are disclosed in "High-density data storage using proximal probe techniques" by H. J. Mamin et al., IBM Journal Research Development, Vol. 39, No. 6, November 1995. A single tip of an AFM cantilever is placed in contact with a rotating surface of a polycarbonate storage medium. Bits are represented by indentations or non-indentations written on the storage medium. Writing on the storage medium is accomplished by heating the tip with a pulsed infrared laser. With the tip being in contact with the storage medium, the heated tip softens the polymer surface. As a force is applied to bring the tip in contact with the surface, the tip creates a small indentation. A mechanical reading mechanism is adopted. As the tip rides over the surface of the storage medium, a topographic indentation causes a deflection of the cantilever. This deflection is detected using a standard optical sensor.

"High-Density Data Storage Based on the Atomic Force Microscope", by H. J. Mamin et al., Proceedings of the IEEE, Vol. 87, No. 6, June 1999, discloses another single tip based storage device with a rotating disk as storage medium. A single tip at the end of an AFM cantilever is placed in contact with a rotating surface of a polycarbonate storage medium. Bits are represented by indentations or non-indentations in the storage medium. Writing is accomplished by heating the tip electrically via two conducting legs, which are connected with the tip. Reading is accomplished with a piezoresistive sensor, sensing the deflection of the cantilever when scanning an indentation.

Applicant's U.S. Pat. No. 5,835,477 discloses a storage device with a recommendation for rewriting such a storage device. The storage device comprises a circuit for distinguishing between information which is to be erased from a first section of the storage medium and information which is not to be erased in this section. The information not to be erased is copied into another section of the storage device. Afterwards, the first section can be erased.

"The Millipede—More than one thousand tips for future AFM data storage" by P. Vettiger et al., IBM Journal Research Development, Vol. 44, No. 3, May 2000, shows a data storage device based on a mechanical x-/y-scanning of a storage medium with an array of probes each having a tip. The probes are scanning assigned fields of the storage medium in parallel, so high data rates can be achieved. The storage medium comprises a thin polymethylmethacrylate (PMMA) layer. The probes are scanning the polymer layer in a contact mode. The contact mode is achieved by applying small forces to the probes so that the tips of the probes can touch the surface of the storage medium. Therefore spring cantilevers are carrying the sharp tips on their end section. Bits are represented by indentations or non-indentations in the polymer layer. The cantilevers respond to these topographic changes in the surface.

Indentations are written on the polymer surface by thermo-mechanical recording, whereas the local probe is heated with a current or voltage pulse during the contact mode, so that the polymer layer is softened locally where the tip touches the polymer layer. The result is a small indentation in the layer, having nanoscale diameter. Reading is also accomplished by a thermomechanical concept. The heater cantilever originally used only for writing is given an additional function of a thermal reading sensor by virtue of its temperature dependent resistance. For reading purposes, the resistor is operated at a temperature that is not high enough to soften the polymer as is necessary for writing. The thermal sensing is based on the fact that the thermal conductance between the probe and the storage substrate changes when the probe is moving into an indentation, as the heat transport will be more efficient. Consequently the heater's temperature and hence its resistance will decrease. Thus, changes of the continuously heated resistor are monitored while the cantilever is scanned over a corresponding data field.

For reasons of power conservation, periodic current or voltage pulses of short duration, rather than DC current or DC voltage, are applied to the cantilevers in order to heat the cantilever to the appropriate temperature for reading purposes. In addition, applying a DC current or a DC voltage would increase the heat transferred to the storage medium and reduce its average lifetime.

Since the storage medium is moved relatively to the probes with a certain velocity, every T seconds a reading pulse has to be fired to the probes for mark and therefore data detecting purposes. As used herein "mark" is understood as physical representation of an information unit. Referring to prior art storage devices, marks are indentations and non-indentations for instance. T corresponds to the time it takes for a probe to scan the distance between the centers of two consecutive marks at a given scanning velocity. The duration of such reading pulses is small compared to the time it takes for a probe to scan over a mark. Accurate timing of the pulses becomes critical, since the amplitude of a response signal caused by a reading pulse drops as the probe moves away from the center of an indentation mark. As a result optimum data detection is obtained if reading pulses are fired whenever the probe is in a position corresponding to the center of a mark. By "optimum data detection" is meant that the probability of detecting a bit corresponding to a certain value, given that a bit corresponding to the opposite value has been stored, is minimized. But even firing a pulse at the right time once, and therefore showing an accurate clock phase to meet the center of a mark, is no guarantee for meeting the centers of following marks with succeeding pulses. This may be due to variations of the scanning velocity or to variations of the clock phase or frequency.

Accordingly, it is a challenge to provide a nanoscale storage device and a method for operating the storage device with an accurate timing for firing reading pulses in a scanning mode.

SUMMARY OF THE INVENTION

According to one aspect of the invention, a method of operating a storage device includes storing data in the form of marks in a storage medium; scanning the storage medium with at least one probe operating in a scanning mode; and utilizing a control unit to provide a pulsed reading signal for data detecting in the scanning mode, and providing the probe with oversampling reading pulses in a clock mark scanning mode, wherein the control unit further comprises an input for a response signal to the oversampling reading pulses, and a determination unit for determining the clock dependent on the response signal; wherein the storage medium comprises marks for determining a clock of the pulsed reading signal.

Advantages of the method and its embodiments correspond to the advantages of the inventive apparatus and its embodiments described above.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

FIG. 3a is a perspective view of a tip shaped probe, and FIG. 3b is a cross sectional view of an indentation mark, written by the tip shaped probe according to FIG. 3a.

FIG. 9a is a block diagram of an indication pattern detection circuit according to the present invention, and FIG. 9b shows a pattern of a corresponding multiplier output value, while FIG. 9c shows a corresponding multiplier output signal.

Different figures may contain identical references, representing elements with similar or uniform content.

DETAILED DESCRIPTION

Figure 1:
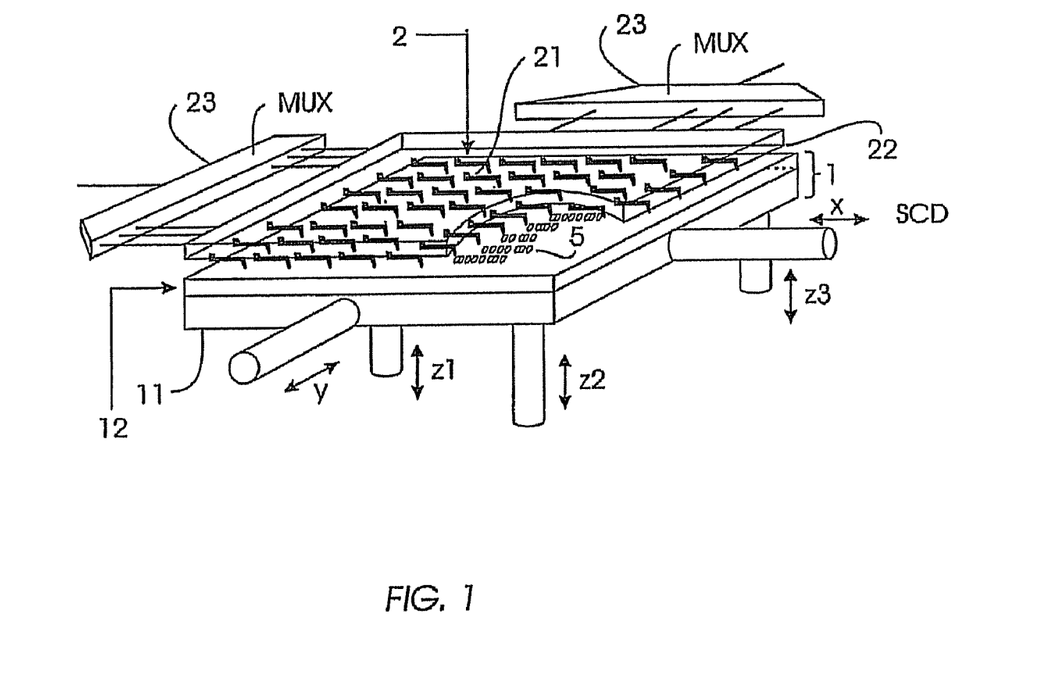
FIG. 1 is a perspective view of a storage device in accordance with the present invention.

FIG. 1 shows a perspective view of a storage device in accordance with the present invention. A storage medium 1 comprising a substrate 11 and a polymer layer 12 is facing a probe array 2 having a plurality of probes 21.

Figure 3:
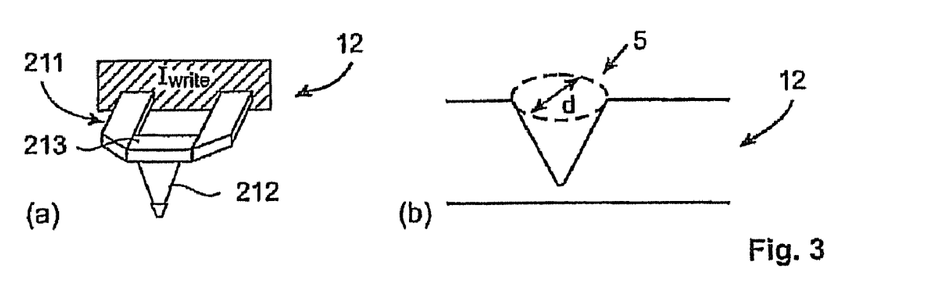

Probes 21 are mechanically linked to a linking element 22 having the shape of a plate. The linking element 22 is transparent and cut open at one edge solely for illustrative purposes. FIG. 3a shows a perspective view of a single probe 21. The probe 21 comprises a spring cantilever 211 with a tip 212 at its end. The cantilever 211 is sensitive to vertical forces. The probe 21 further comprises a heater platform 213 between legs of the cantilever 211 and the tip 212.

Marks are written on the storage medium using a thermomechanical technique. A local force is applied to the polymer layer 12 by the probe 21. Polymer layer 12 is softened by heating the heater platform 213 with a current or voltage pulse during contact mode, so that the polymer layer 12 is softened locally where the tip 212 touches the polymer layer 12. The result is a small indentation mark 5 in the polymer layer 12 according to FIG. 3b, having nanoscale diameter d.

In order to read data, the polymer layer 12 is moved under the probe array 2 at a constant velocity. The scanning velocity and the distance between marks determine the data rate of the system in marks/bits read or written per second. Reading is also accomplished with a thermomechanical concept. The heater cantilever 211 used for writing is given the additional function of a thermal reading sensor by exploiting its temperature dependent resistance. For reading purposes, the resistor is operated at a temperature that is not high enough to soften the polymer layer 12 as is necessary for writing. For reasons of power conservation, periodic current or voltage pulses of short duration are applied to the cantilevers in order to heat the cantilever to the appropriate temperature for reading purposes, rather than a DC current or DC voltage. This pulsed reading signal determines operating temperature at the cantilevers for data readout. Data detection is performed by monitoring the current or voltage signals resulting from the application of reading pulses to the cantilever as it scans over tracks. The thermal sensing is based on the fact that the thermal conductance between the probe 21 and the storage medium 1 changes when the probe 21 is moving into an indentation mark 5 as the heat transport will be more efficient. The probe temperature drops due to more efficient heat transport through air, as the cantilever tip 212 moves into a polymer indentation mark 5 where the distance between heater and polymer is reduced. Since indentation marks 5 do not have vertical walls in practice, they are modeled as conical indentations of the storage medium 1, see FIG. 3b. During motion of the tip 212, the temperature change of a heated cantilever 211 is gradual as it moves from a mark edge down towards its center, where the mark depth is maximum. Consequently the heater platform temperature and hence its resistance will decrease. Thus, changes of the heated resistor values could be monitored while the cantilever 211 is scanned over data marks.

Solely for demonstration purposes, marks 5 are shown only in a confined area of the storage medium 1 in FIG. 1.

The probes 21 are scanning the entire storage medium 1 either by moving the probe array 2 relatively to the storage medium 1 or vice versa. In FIG. 1 the storage medium 1 is moved while the probe array is fixed in its position. Arrows x and y indicate the scanning direction, while z arrows indicate an approaching and leveling scheme in vertical direction for bringing the entire probe array 2 into contact with the storage medium 1.

The storage medium 1 is divided into fields, not explicitly shown in FIG. 1. Each probe 21 of the array 2 scans, e.g.

writes or reads, only its own data field. Consequently a storage device with for example 32.times.32 probes will include 32.times.32=1024 fields.

Figure 2:
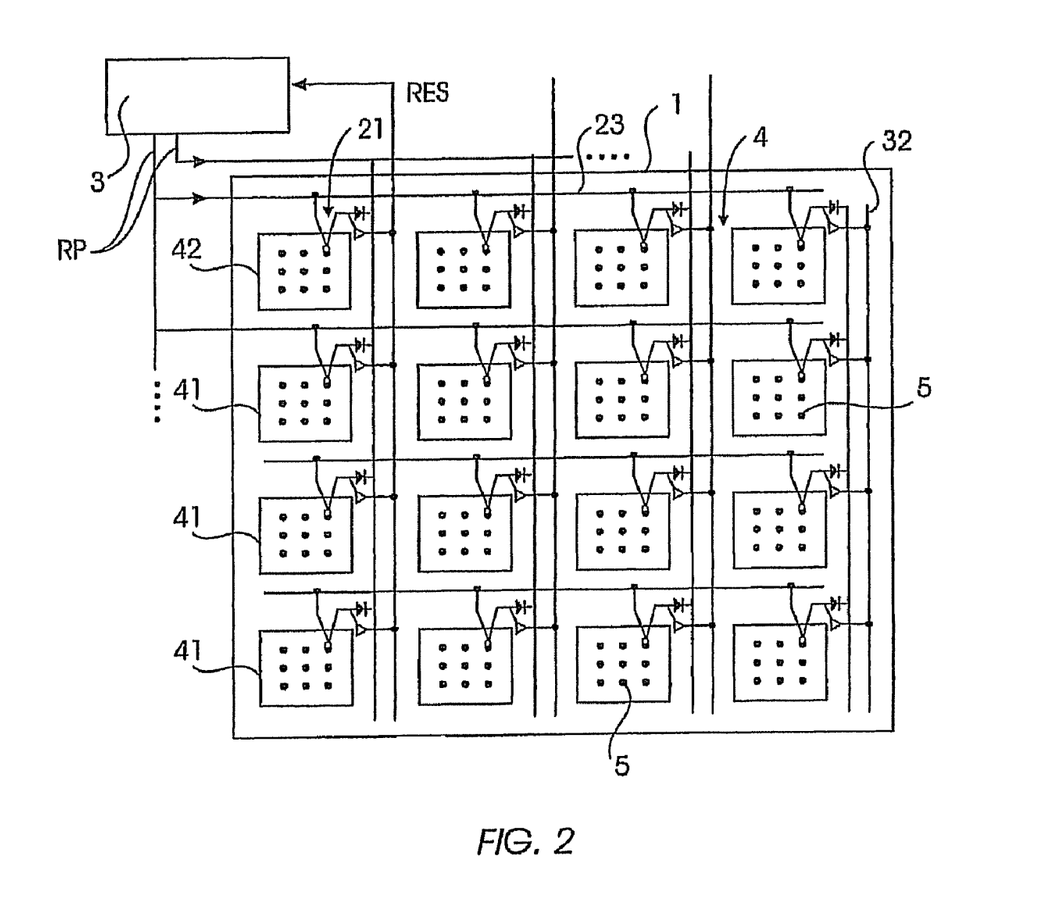
FIG. 2 is a top view of a storing medium with an illustrative probe array in accordance with the present invention.

At least one of these fields, not shown explicitly in FIG. 1 but shown in FIG. 2 with the reference 42, comprises marks 51 for determining a clock of the pulsed reading signal used by the storage device for applying pulses to the cantilevers for data reading purposes. Only when these pulses are fired and the cantilever simultaneously meets a mark center or is close to a mark center, can reliable data detection be obtained. During normal operation, one such pulse is fired every T seconds—corresponding to the horizontal distance of the marks 5 and the scanning velocity. The duration of such a pulse is small compared to the time it takes for the cantilever to move in and out of the mark 5.

The clock mark field is preferably prewritten by the device manufacturer, while the other data fields are not prewritten with data when case the storage device has rewritable properties, but are prewritten with data in case the storage device is read only.

The storage device is preferably operated with row and column time-multiplexing addressing, schematically shown by multiplexers 23. The storage device according to FIG. 1 is ready for parallel scanning of all fields. Storage fields might also be scanned row by row or column by column. Every movement of a single probe 21 is applied to all the other probes 21 due to mechanical coupling of the probes 21.

FIG. 2 presents an illustrative top view of a storage medium 1 with four times four fields 4 arranged in rows and columns. Each field comprises marks 5. There are nine marks 5 disclosed within each field 4. This amount is of course not of true nature but only illustrative, as it is customary for these kind of storage devices to pack as much data marks on the storage medium 1 as resolution allows. All of the depicted fields 4 are data storage fields 41, except the field 42 in the upper left corner containing exclusively operational data for running the storage device. This field contains clock marks 51 for deriving the clock of the pulsed reading signal, that is applied for reading all the other data fields 42. The fields 4 are bordered in order to make them visible. Such borders in forms of grooves might also be placed on the storage medium 1 for defining the beginning and the end of a field 41, 42, but this is not necessarily the case. Rather, fields 4 are defined by the extent of marks 5 a single probe 21 is responsible for.

In addition, only a few of illustrative tip shaped probes 21 are shown in a scanning position touching every one of fields 41 and 42. The probes 21 are electrically connected with a time multiplexer 32, represented illustratively with common wires in FIG. 2.

The upper left probe 21 is scanning the clock mark field 42. Only some of the probes 21 are illustratively shown to provide clarity in the drawing. The upper left probe is connected to a control unit 3. The control unit 3 outputs a pulsed reading signal RP, that is provided to the probe of every field for mark detection purposes and therefore reading purposes. Oversampling reading pulses are assigned to the clock mark field 42. A response signal RES to this oversampling reading pulses is fed to a determination part of the control unit 3, which is not shown explicitly in FIG. 2. This determination unit derives a clock of the pulsed reading signal RP from information delivered from the response signal RES. The determination unit 31 itself as well as the entire control unit 3 may comprise a microcomputer with respective software programs, or hardware, or be embodied partly as hardware logic and partly as software, or be embodied else. The determination unit 31 can be part of an overall device control unit 3 or can be a separate unit. In general the term unit is understood rather as a function than as a physical unit.

Redundancy basically means repeating the same information in several spatially separated areas of the storage medium in order to increase robustness to disturbances. Clock marks can be repeated within a field in order to be able to determine clock continuously. In the coarse level, an entire clock mark field can be duplicated to at least one more field of the array and therefore to a different area of the storage medium. The benefit of this embodiment is, that clock information can be generated at a sufficient frequency and once a clock mark field is destroyed due to scratches, media defects or other media-dependent imperfections, scanning information can be derived from another source, that is the further clock mark field.

Figure 4:
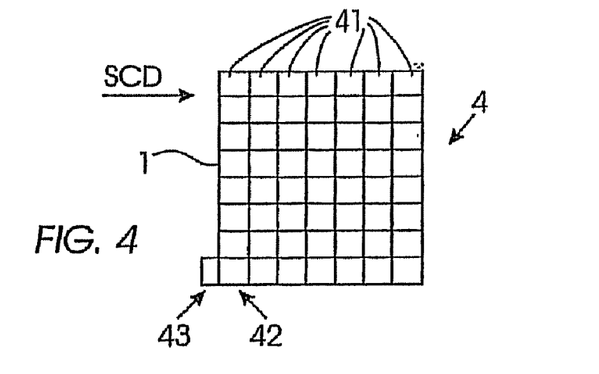
FIG. 4 illustrates a storage medium in top view according to the present invention.

Preferably, several parameters are estimated prior to data detection. Besides clock phase and clock frequency, gain of an overall read channel is determined, and it is also necessary to identify the boundaries of data records. Therefore it is advantageous to provide a field on the storage medium called the header field, that contains marks, which allow determining these parameters. FIG. 4 shows such a storage medium 1 with an array of fields 4 in top view, fields 41 with marks representing data, and a single field 42 with marks representing clock marks, and a header field 43 with marks used for determining the above mentioned parameters that are fundamental for further data acquisition. It is apparent from FIG. 4 that due to the position of the header field 43, this header field 43 is scanned first from its associated probe in a scanning mode. Assuming scanning in a scanning direction SCD, all the other probes in the column of the header field scanning probe are not able to scan marks due to the lack of marks and consequently the lack of fields above the header field 43. Probes of other columns might scan respective marks while the header field 43 is scanned by its associated probe due to the simultaneous motion of the entire array of probes. But reading pulses are preferably not applied to theses probes during this period. Alternatively probes of other columns might not even scan marks due to lack of marks. This requires a special placement of the fields: Columns of fields can be aligned with spaces between each column. These spaces are supposed to have the width of the header field 43.

Figure 5:
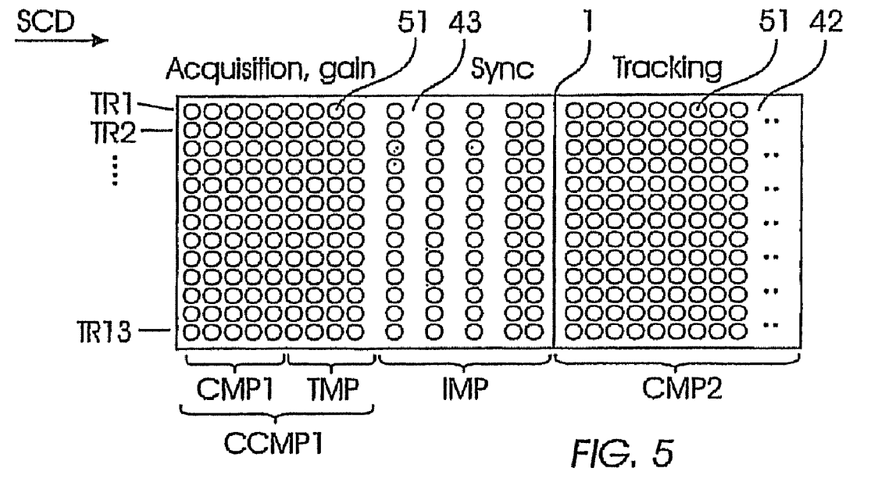
FIG. 5 illustrates a header field and a clock field of the storage medium in a first embodiment according to the present invention.

FIG. 5 shows a top view of a part of the field array 4 illustrated in FIG. 4. It presents the clock mark field 42 of FIG. 4 together with the header field 43 according to FIG. 4. The clock mark field 42 as well as the header field 43 include several tracks TR1 . . . TR13. The associated probe is following the scanning direction SCD during scanning mode. Along the tracks TR1 . . . TR13 there are marks 51 designed for determining clock and other operational data. Clock marks 51 in FIG. 5 have physical properties of indentations—depicted as circles—and non-indentations—not depicted, but still representing logical values. Presence of a mark indentation corresponds to a logical "1", absence of an indentation corresponds to a logical "0". All indentations—also called pits—are nominally of equal depth and size, and are placed at a fixed horizontal distance from each other along a track TR.

Certain alignments of clock marks 51 represent mark patterns CMP1, TMP, IMP and CMP2. These mark patterns CMP1, TMP, IMP and CMP2 are repeated in each track TR. This is advantageous, since a field is usually scanned track by track, so that clock and other operational information can be determined continuously. A track of the header field 43 is scanned and read before an assigned track of the clock mark field 42 is scanned and read. The header field 43 is covering a smaller area on the storage medium than the other fields 41 or 42.

The header field 43 includes the mark patterns CMP1, TMP, and IMP, while the clock mark pattern 41 includes the mark pattern CMP2. The first clock mark pattern CMP1, the threshold mark pattern TMP and the indication mark pattern IMP of the header field 43 are used for initial synchronization and may be interpreted as a preamble, followed by the second clock mark pattern CMP2 of the clock mark pattern field 41, completely filled with logical "1", so being entirely covered with indentation marks for tracking the optimum clock phase during normal reading operations. The transition between the preamble/header field 43 and the clock mark pattern field 41 should be reliably detected, as it also indicates to the remaining storage fields 42 the start of data records in form of data marks.

Mark patterns can be expressed in another way by a binary data vector sp=[ao, as, ar], where ao is a preferred binary data vector of length 8No (No bytes) representing the first clock mark pattern CMP1 and the threshold mark pattern TMP with all marks representing the value "1", as is a preferred binary vector of length 8Ns (Ns bytes) representing a part of the indication mark pattern IMP, given by the repetition of the sequence (0, 1, 0, 1, 0, 1, 0 1), and ar is a binary vector of length 2 given by the string (1,0), representing a second part of the indication mark pattern IMP.

Figure 6:
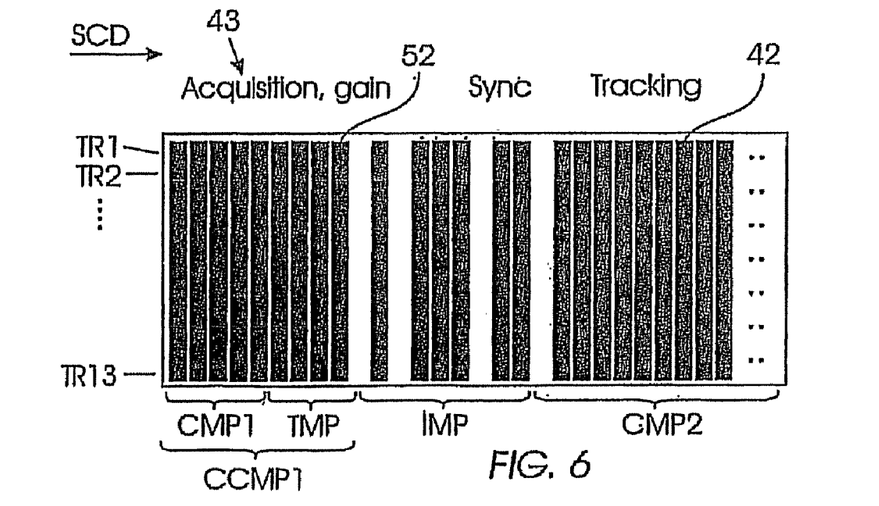
FIG. 6 illustrates a header field and a clock field of the storage medium in a second embodiment according to the present invention.

FIG. 6 corresponds to FIG. 5 and shows also the header field 43 and the clock mark field 42 with corresponding mark patterns. The only difference is, that vertically aligned marks are linked to vertical grooves. Track alignment and scanning direction remain the same. Benefit of this embodiment is, that clock information can be derived from these fields 43 and 42 even when the associated probe is set vertically off track.

Assuming that the initial frequency offset is within a predetermined small range, usually ±100 part-per-million (PPM), the following steps are proceeded:
1) reading the first clock mark pattern CMP1 and acquiring a first approximation of a clock phase;
2) reading the threshold mark pattern TMP and estimating an overall channel gain needed to set a threshold for threshold detection;
3) reading the indication mark pattern IMP and detecting the transition between the header field 43 and the clock mark field 42;
4) reading the second clock mark pattern CMP2 and tracking the optimum clock phase.

As velocity V for moving the probes across the storage medium is known, and the mark distance S between consecutive marks is known, generally only one reading pulse is to be fired every T seconds for data mark detecting purposes, with T=S/V, provided the pulse is fired at the right time when the probe meets the mark center. T is also referred to as modulation interval.

Mathematically, with assuming a linear read channel model, a response signal to a reading pulse, also called channel output signal, for a sequence of N written bits, at the sampling instant $t_k$ can be expressed as $$r_k(\varepsilon) = r(t_k, \varepsilon)$$

$$= \sum_{n=0}^{N-1} a_n A g(t_k - nT - \varepsilon T) + w_k$$

where an is a binary symbol with values taken from the alphabet {0, 1}, T denotes the modulation interval, As the overall channel gain, g(t) is the overall channel impulse response, epsilon is a possibly slowly time-varying phase shift with respect to an ideal reference clock, and wk is an additive noise sample.

Since the phase of the clock at the particular instant when a particular probe meets a clock mark center is not initially known, a series of pulses is fired within the period T when the associated probe is scanning the header field 43 for sampling the deflection of the probe on its way from a first clock mark 51 to a second clock mark 51. Applying this series of pulses is also referred to as oversampling. At least clock marks 51 of the first clock mark pattern CMP1 are oversampled. The second clock mark pattern CMP2 in the clock mark field 41 is also preferably read in the oversampling mode. In case there are more tip shaped probes for parallel mark scanning, preferably only the probe reading the header field 43 and the clock mark field 42 is committed to scan its clock marks in the oversampling mode. The other data mark reading probes are preferably not subject to oversampling in order to reduce power consumption.

Figure 7:
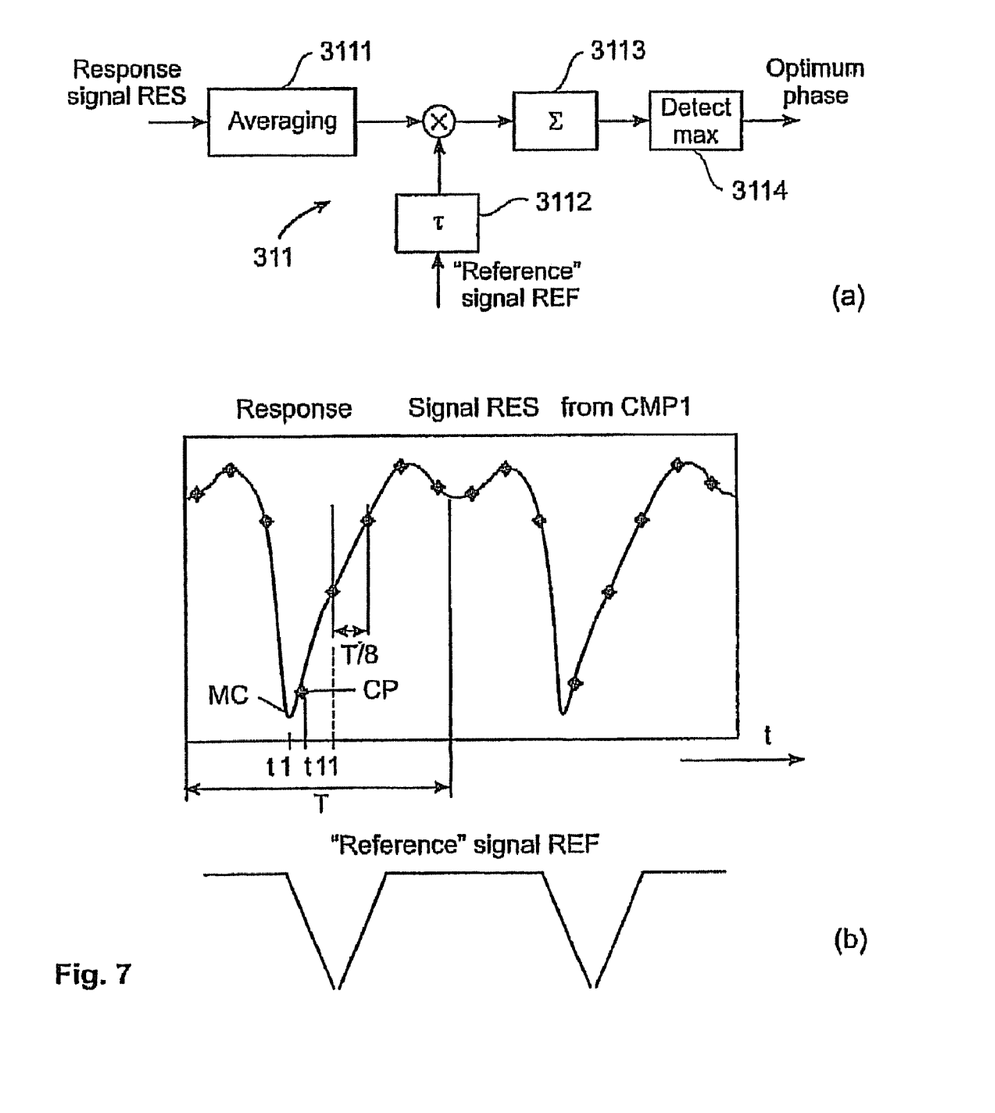
FIG. 7a illustrates a block diagram of an estimation circuit for initial determination of the clock according to the present invention.
FIG. 7b illustrates corresponding input signals.

When applying reading pulses to a probe, a response signal is received that shows the deflections of the probe due to topographic mark structures in its course. Such a response signal RES to oversampling pulses over time t is shown in FIG. 7b. The response signal RES is a discrete signal, having values characterized in FIG. 7b with rhombic signs. The part of the response signal RES shown in FIG. 7b is the response of scanning two "1"—marks of the first clock mark pattern CMP1. As can be derived from FIG. 7b, this first clock mark pattern CMP1 preferably consists of exclusively "1" clock marks 51, as "0" marks do not lead to a deflection of the probe and therefore ideally show a constant zero level in the response signal RES. Oversampling factor is eight, so eight samples are generated every T seconds. Oversampling the first clock mark pattern CMP1 helps in determining an initial phase of the clock.

In addition FIG. 7b shows an instant t1, at which a reading pulse for mark detection should be fired, since the associated probe would meet the mark center and would deliver an absolute maximum value MC. With the actually applied oversampling reading pulses, the pulse fired at time t11 and delivering value CP comes most close to the aforementioned time t1 and its corresponding value MC. But a better instant can be derived from scanning the first clock mark pattern CMP1. FIG. 7a shows an estimation circuit 311 in a block diagram for supplying an initial phase adjustment.

According to FIG. 7a, the response signal RES is correlated with a reference signal REF by means of the phase estimation unit 311 to estimate the optimum phase. Before correlating, the response signal RES is conducted to averaging means 3111 for filtering noise and other disturbances. The reference signal REF represents an ideal response signal of sequentially scanned "1"—indentation marks. The time basis is known for the reference signal REF. Reference signal REF can be an analog signal or have discrete values.

Reference signal REF and response signal RES are correlated in a way, that the reference signal REF is shifted with factor Tau represented with a time shift block 3112 in FIG. 7a—over the response signal RES. So factor TAU represents a shift in time between response signal RES and reference signal REF. For every value of TAU the time-corresponding values of the response signal RES and the reference signal REF are multiplied and the results of the multiplications are added in an adder 3113 to yield a correlation value.

In the end, a comparator 3114 is comparing these correlation values. The comparator 3114 detects the maximum of correlation added values. The highest correlation value is reached, when reference signal REF and response signal RES are overlapping best. There is a certain shift in time TAU=epsilon corresponding to this detected highest correlation value. Since the time basis for the reference signal REF is known as well as the time shift TAU=epsilon has been estimated to identify the highest correlation value and hence a maximum in the response signal RES, the instant at which the response signal RES reaches its maximum can be estimated and therefore a reading pulse can be fired at this particular instant.

The time precision of meeting the mark center with an applied reading pulse is dependent on an oversampling factor for the reference signal REF in case the reference signal REF is a discrete signal. The larger the oversampling factor applied to the reference signal REF is, the more precise the phase of the clock such that a reading pulse is applied to the cantilever when it meets the mark center can be estimated.

Mathematically, the estimate epsilon of a phase shift epsilon is obtained by resorting to a correlation method and relying on the knowledge of the predefined binary vector ao. The estimate epsilon is given by $$E=(1/T)\max(\text{over}\tau)\{\Sigma_{n=0}^{Q-1} r_n(\epsilon) \text{gref}(n^{T/Q}-\tau)\}$$

Where gref represents an ideal reference signal REF over one period T of a channel impulse response which closely resembles an actual impulse response, and where gref(t) denotes a periodic repetition of gref(t) with period T, where {rn(epsilon), n=0, ..., Q−1} represents a sequence of samples of the response signal RES, where the sequence of samples {m(epsilon), n=0, ..., Q−1} is obtained by first removing a dc-offset, then averaging over NA<8No modulation intervals the channel output sequence.

It has been observed that a simple approximation of the reference signal to a triangular waveform is sufficient for proper phase acquisition. Therefore, no complex channel identification techniques are needed.

Determining an at least approximate optimum phase according to FIGS. 7a and 7b gives a first step to determine the phase of the clock for future reading pulses RP.

FIG. 5 shows a threshold mark pattern TMP following the first clock mark pattern CMP1 in the header field 43. The threshold mark pattern TMP is used for determining a threshold for mark classification purposes. When detecting a mark by means of firing a reading pulse, the response to this reading pulse has to be evaluated, whether it meets certain criteria. This can include a comparison of the response value to a threshold. When the response value exceeds the threshold, an indentation and e.g. a binary "1" is detected, if not, a binary "0" is detected. A corresponding mark pattern TMP is in charge of delivering support in determining the threshold. In case, a mark can be represented by an indentation or a non-indentation, the threshold mark pattern contains a series of indentations, usually representing a binary value "1", see FIG. 5.

Figure 8:
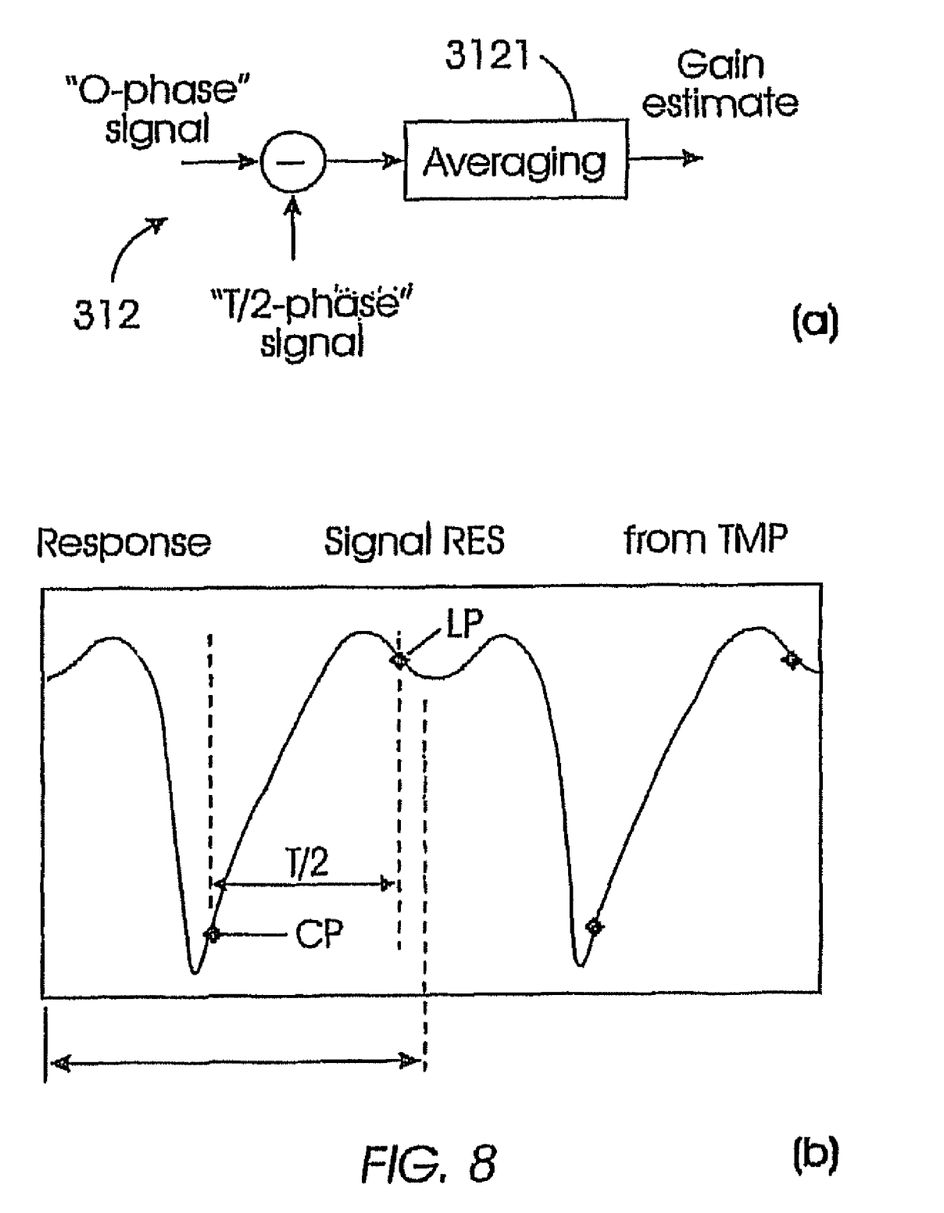
FIG. 8a is a block diagram of a gain estimation unit according to the present invention.
FIG. 8b shows a corresponding input signal.

A response signal RES from the threshold mark pattern TMP is applied to a gain estimation circuit 312 according to FIG. 8a. FIG. 8b shows such a response signal RES over the period of scanning two indentation marks with only two samples per period T, which requires an oversampling factor of at least Q=2. These two samples identify the values CP and LP within one period T of the response samples. The two reading pulses can be placed accordingly, since the above described phase determination identifies at least a preliminary optimum phase for firing a reading pulse to get value CP for response. Accordingly, value LP is acquired when firing a reading pulse T/2 seconds later. The respective two values CP and LP are subtracted according to FIG. 8a. The absolute value acquired from subtracting the values CP and LP is also called gain.

Another way of performing this calculation is to take the value CP of the response signal RES, in diagram 8a called the "0-phase-signal" and subtract instantaneously the value from a T/2-phase shifted "T/2-phase signal". When the value CP is obtained in the "0-phase signal", simultaneously the value LP is obtained in the "T/2-phase signal", so the two values CP and LP can be subtracted immediately. Applying this calculation to a series of values CP and LP of many periods T when scanning over a plurality of indentation marks, the subtracting results can be averaged by a corresponding unit 323. This averaged gain is preferably divided by two to end with a threshold value for mark classification.

As both the first clock mark pattern CMP1 and the threshold pattern TMP contain indentation marks, representing "1's", these two patterns can be merged into a single clock and threshold pattern CCMP1 according to FIG. 5, even with initial phase acquisition and gain estimation performed in parallel.

According to FIG. 5, the next mark pattern in sequence is the indication mark pattern IMP. This indication or sync mark pattern IMP consists of a repetition of the special 8-bit word (0, 1, 0, 1, 0, 1, 0, 1) followed by the binary string (1, 0), according to FIG. 5 and FIG. 9b.

Figure 9:
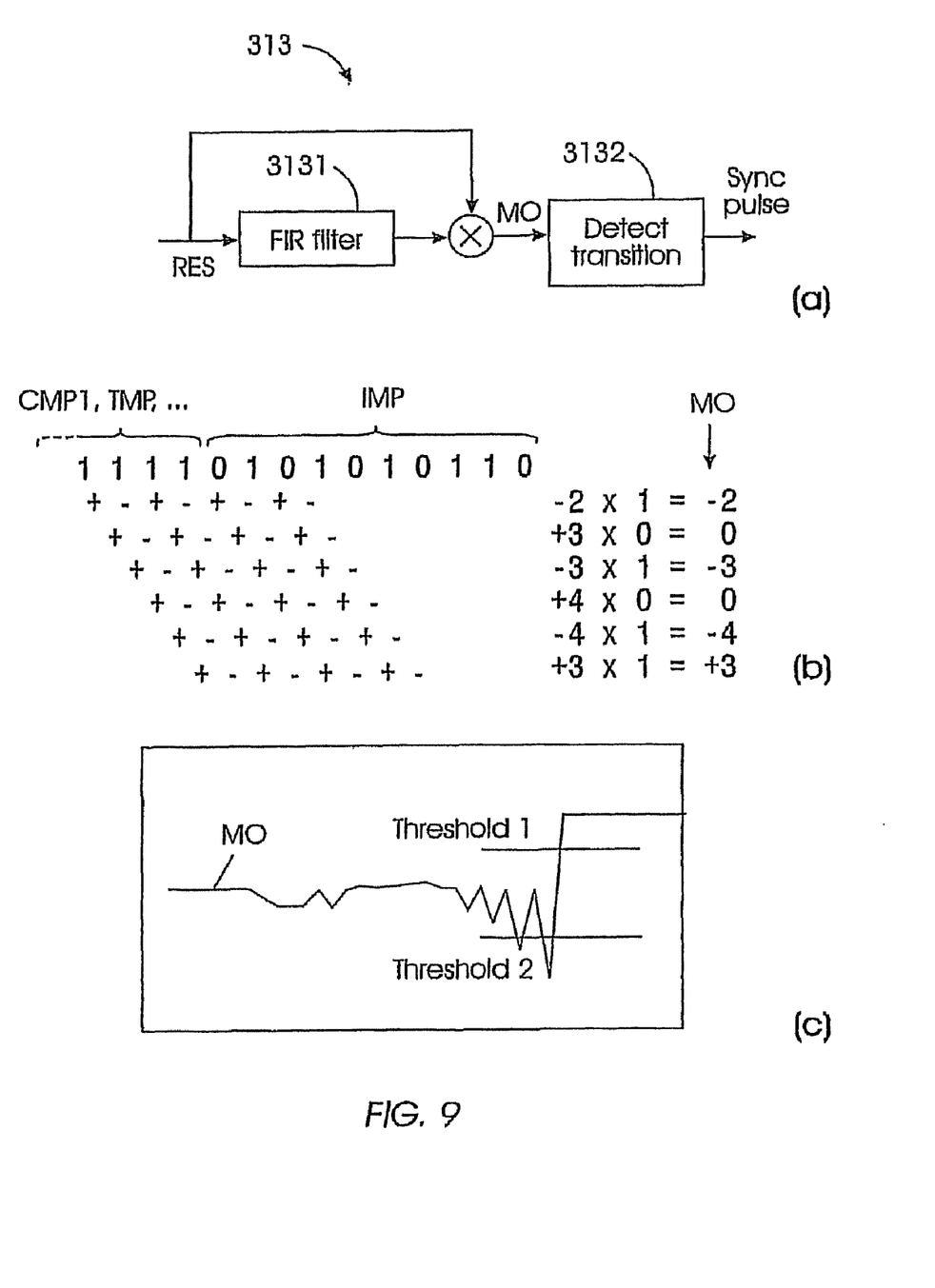

FIG. 9a shows a block diagram of an indication mark pattern detection circuit 313. The end of the indication mark pattern indicates the transition between clock estimation and threshold acquisition mode described above and clock tracking mode described below. Detection is based on a correlation method. A sync pulse is generated to indicate this transition. The sync pulse generation is achieved by first filtering the response signal RES by an 8-tap FIR filter 3131 with integer coefficients (+1, −1, +1, −1, +1, −1, +1, −1) and then multiplying the filter output by the response signal RES. A sharp transition in the obtained sequence of multiplier output serves as an indicator for the beginning of clock marks in the clock mark field 42 as well as for the beginning of data in the data storage fields 41. This sharp transition in the multiplier output is detected by a transition detector 3132.

FIG. 9b illustrates the basic principle for the case Ns=1. The last columns of numbers represents the sequence of multiplier output. The multiplier output is shown in a diagram in FIG. 9c over time and operation of the transition detector 3132 is illustrated. Consecutive multiplier output values are compared with two thresholds number one and number two. In case the multiplier output MO is below threshold number two and the next multiplier output value MO is above threshold number one, a sharp transition is detected and the sync pulse is provided. In FIG. 9c a sharp transition from values −4 to +3 occurring in correspondence with the reversal of the data pattern from (0 1) to (1 0) can be detected by the transition detector 3132 of FIG. 9a. The initial estimate of the gain according to FIG. 8 allows the transition detector 3132 to set thresholds and very reliably detect this reversal. By increasing the length of as, the size of the transition also increases, thereby rendering the detection of the beginning of information data extremely accurate even under severe noise or frequency offset conditions.

Figure 10:
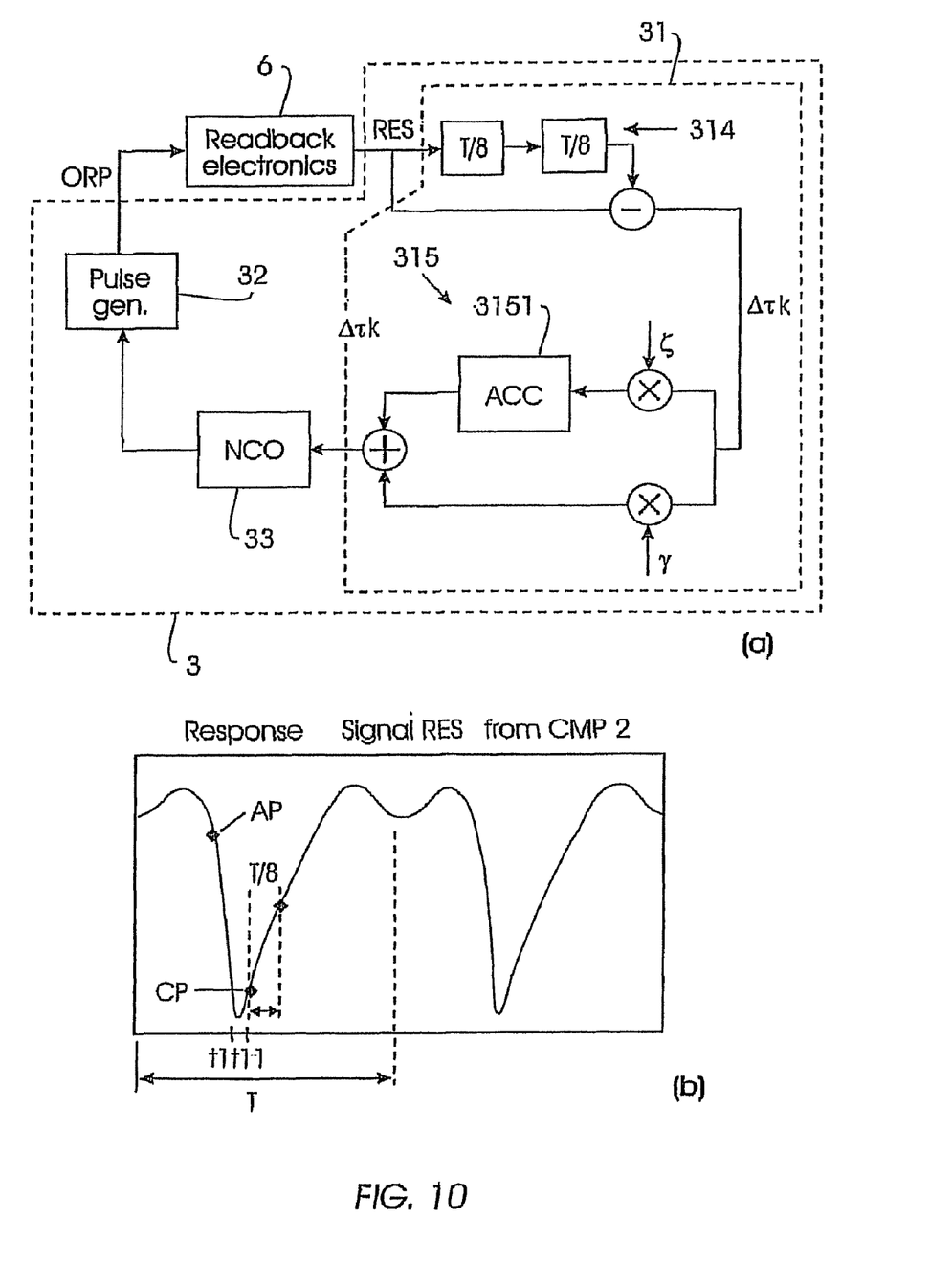
FIG. 10a illustrates a control unit according to the present invention.
FIG. 10b illustrates a corresponding input signal.

FIG. 10a shows a control unit 3 according to the present invention, comprising a determination unit 31, oscillating means 33 and a pulse generator 32.

The clock mark scanning probe is provided with oversampling reading pulses ORP from the pulse generator 32. The pulse generator 32 itself can also deliver non-oversampling reading pulses to data mark scanning probes. The pulse generator 32 is controlled by oscillating means, so that the pulse generator 32 fires reading pulses with a determined frequency and phase. Oversampling reading pulses are applied to the clock mark scanning probe. Appropriate readback electronics 6, for example, a thermoelectrical sensor including amplifying and filtering elements, deliver a response signal RES to the applied oversampling reading pulses ORP. The determination unit 31 is fed with the response signal RES.

The determination unit 31 deals with determining the clock of the pulsed reading signal RP using the second clock mark pattern CMP2 of the clock mark pattern field 41 according to FIG. 5. This clock determination is achieved by adjusting the phase and frequency of the clock obtained by using the first clock mark pattern CMP1. It allows determining the phase and frequency of the clock so that the reading pulses are fired to meet the instant, at which the probes are crossing the mark centers. This ongoing fine-adjustment process is also called tracking of the optimum sampling phase.

FIG. 10b shows a response signal RES over two periods T, when scanning two "1" mark indentations of clock mark field 42 in an oversampling mode. According to FIG. 10b, at least three reading pulses are fired each period T leading to respective response values shown with rhombic signs. These three sample values are of particular interest. The CP value at instant t11 meets the mark center most close as obtained by using the first clock mark pattern CMP1 and the corresponding phase estimation unit 311 according to FIG. 7. The sample value AP is the response value according to the pulse fired T/Q seconds before t11 from the pulse generator, with an exemplary oversampling rate Q=8. The sample value BP is the response value according to the pulse fired T/Q seconds after the time t11.

The determination unit 31 comprises a delay circuit 313, delaying each response value of the response signal RES for twice T/Q seconds. The delayed value is subtracted from the actual value. Of special interest is the difference between the values AP and BP. Provided the oversampling factor Q is sufficiently large, the difference between these two particular values AP and BP shows the deviation of the actual sampling phase from the optimum sampling phase. The optimum sampling phase is indicated in FIG. 10b with the time mark t1, when the mark center would be met with a reading pulse fired at time t1 and a response value MC would be generated.

This deviation DELTA Tau k is computed as DELTA Tau k=r(kQ+1)−r(kQ−1) with r(kQ+1), r(kQ−1) representing the values BP and AP according to FIG. 10b. This estimate of the phase deviation Delta Tau k is input to a second-order loop filter 312 which provides an output given by Delta T k=sk+ Iota Delta T k, where a discrete time integrator 3121 is recursively updated as s(k=1)=sk+Eta Delta Tau k. The second-order loop filter 312 transfers the estimate of the phase deviation Delta Tau k into a control signal for controlling the frequency and phase of the oscillator means 33. Several tuning parameters are shown.

So the second-order loop filter output Delta T k determines the control signal for a voltage controlled oscillator VCO representing the oscillating means 33. Clearly, the voltage controlled oscillator can be implemented either as an analog oscillator or a discrete numerically controlled oscillator NCO, see FIG. 10a. In the former case a digital-to-analog converter is required to convert the control signal from the digital to the analog domain.

The oscillator means 33 act as a further integrator in the loop. Therefore, a constant control signal Delta T k will result in change of the frequency of the NCO, whereas a control signal of finite duration will result in a change of the NCO phase.

The same basic principles shown in the previous embodiments can also be applied in the case when a dedicated header field 43 with the above illustrated mark patterns and a dedicated clock mark field 42 with clock marks representing clock information are not available, or when a storage medium is scanned by a single probe. In these cases, at least one designated data storage field contains the first clock mark pattern and the threshold mark pattern or a combined clock mark pattern, which allow to estimate the optimum phase and the gain. It is advantageous to provide also an indication mark pattern to obtain a reliable indication of the end of clock and other operational data marks and the beginning of data marks. Tracking is then accomplished by a decision aided second-order loop similar to the one proposed in the previous section. A designated data field that is being used to provide in addition timing information operates in an oversampled mode. During tracking mode the input signal to the oversampling loop filter is given by Delta Tau k=ak(r(kQ=1)−r(kQ−1)), where ak denotes the detected bit value.

While the invention has been described with respect to certain preferred embodiments and exemplifications, it is not intended to limit the scope of the invention thereby, but solely by the claims appended hereto.

The invention claimed is:

1. A method of operating a storage device, the method comprising:
   storing data in the form of marks in a storage medium;
   scanning the storage medium with at least one probe operating in a scanning mode; and
   utilizing a control unit to provide a pulsed reading signal for data detecting in the scanning mode, and providing the probe with oversampling reading pulses in a clock mark scanning mode, wherein the control unit further comprises an input for a response signal to the oversampling reading pulses, and a determination unit for determining the clock dependent on the response signal;
   wherein the storage medium comprises marks for determining a clock of the pulsed reading signal.

2. The method of claim 1, wherein the storage medium comprises a clock mark pattern for determining an approximation of the clock.

3. The method of claim 1, wherein the determination unit comprises a phase estimation unit for determining an initial phase adjustment of the clock.

4. The method of claim 1, wherein the storage medium comprises a clock mark pattern for determining the clock.

5. The method of claim 1, wherein the determination unit comprises a filter.

6. The method of claim 1, wherein the storage medium comprises a threshold mark pattern for determining a threshold for mark classification purposes.

7. The method of claim 4, wherein the storage medium comprises an indication mark pattern indicating the beginning of a second clock mark pattern.

8. The method of claim 1, wherein mark patterns are arranged in a scanning direction as follows: a first clock mark pattern, a threshold mark pattern, an indication mark pattern and a second clock mark pattern.

9. The method of claim 1, further comprising utilizing an array of probes wherein the storage medium has fields with each field to be scanned by an associated one of the probes, and one of the fields comprises clock marks.

10. The method of claim 9, wherein the storage medium comprises a header field being adjacent to only one of the fields, and the header field has an associated scanning probe scanning both the header field and an adjacent field.

11. The method of claim 10, wherein the header field comprises a first clock mark pattern, a threshold mark pattern, and an indication mark pattern.

12. The method of claim 9, wherein the control unit is designed for applying the pulsed reading signal to several field scanning probes.

* * * * *